(12) United States Patent
Binek et al.

(10) Patent No.: US 12,392,489 B2
(45) Date of Patent: Aug. 19, 2025

(54) TURBINE ENGINE SUPPORT STRUCTURE WITH AIRFLOW PORTS

(71) Applicant: RTX Corporation, Farmington, CT (US)

(72) Inventors: Lawrence A. Binek, Glastonbury, CT (US); Jesse R. Boyer, Middletown, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/745,637

(22) Filed: Jun. 17, 2024

(65) Prior Publication Data

US 2025/0003590 A1     Jan. 2, 2025

Related U.S. Application Data

(63) Continuation of application No. 18/217,143, filed on Jun. 30, 2023, now Pat. No. 12,013,120.

(51) Int. Cl.
| | |
|---|---|
| *F23R 3/00* | (2006.01) |
| *F01D 9/04* | (2006.01) |
| *F23R 3/50* | (2006.01) |
| *F23R 3/54* | (2006.01) |
| *F23R 3/60* | (2006.01) |

(52) U.S. Cl.
CPC .............. *F23R 3/002* (2013.01); *F01D 9/04* (2013.01); *F23R 3/50* (2013.01); *F23R 3/54* (2013.01); *F23R 3/60* (2013.01)

(58) Field of Classification Search
CPC .. F01D 9/04; F01D 25/24; F23R 3/002; F23R 3/42; F23R 3/425; F23R 3/44; F23R 3/46; F23R 3/50; F23R 3/52; F23R 3/54; F23R 3/56; F23R 3/58; F23R 3/60; F23R 2900/00015; F23R 2900/03342
See application file for complete search history.

(56) References Cited

U.S. PATENT DOCUMENTS

| | | |
|---|---|---|
| 7,836,702 B2 | 11/2010 | Grivas |
| 11,612,938 B2 | 3/2023 | Binek |
| 2014/0090385 A1 | 4/2014 | Kodukulla |

(Continued)

OTHER PUBLICATIONS

EP Search Report for EP Patent Application No. 24185821.6 dated Oct. 28, 2024.

*Primary Examiner* — Scott J Walthour
(74) *Attorney, Agent, or Firm* — Getz Balich LLC

(57) ABSTRACT

An assembly is provided for a turbine engine. This engine assembly includes a combustor, an engine case, a support structure and a monolithic body. The combustor includes a combustor wall and a combustion chamber within the combustor. The combustor wall forms a peripheral boundary of the combustion chamber. The engine case forms a peripheral boundary of a plenum along the combustor. The support structure extends radially from the combustor wall to the engine case. The monolithic body includes the combustor wall, the engine case, the support structure and a plurality of ports arranged circumferentially about an axis. Each of the ports is fluidly coupled with the plenum and projects axially through the support structure. The ports include a first port. The first port includes a cross-sectional geometry that laterally tapers as the first port extends radially outward within the monolithic body.

12 Claims, 7 Drawing Sheets

(56) References Cited

U.S. PATENT DOCUMENTS

| | | |
|---|---|---|
| 2016/0047316 A1 | 2/2016 | Melton |
| 2016/0377290 A1 | 12/2016 | Okazaki |
| 2018/0216826 A1 | 8/2018 | Spence |
| 2020/0182467 A1* | 6/2020 | Binek .................... F01D 9/041 |
| 2020/0362724 A1 | 11/2020 | Binek |
| 2021/0102704 A1 | 4/2021 | Binek |
| 2023/0258337 A1 | 8/2023 | Autret |

\* cited by examiner

TURBINE ENGINE SUPPORT STRUCTURE WITH AIRFLOW PORTS

This application claims priority to and is a continuation of U.S. patent application Ser. No. 18/217,143 filed Jun. 30, 2023, which is hereby incorporated herein by reference in its entirety.

BACKGROUND OF THE DISCLOSURE

1. Technical Field

This disclosure relates generally to a gas turbine engine and, more particularly, to a stationary structure for the gas turbine engine.

2. Background Information

A gas turbine engine includes a stationary engine structure for housing and/or supporting internal rotating components of the gas turbine engine. Various stationary engine structures are known in the art. While these known stationary engine structures have various benefits, there is still room in the art for improvement.

SUMMARY OF THE DISCLOSURE

According to an aspect of the present disclosure, an assembly is provided for a turbine engine. This engine assembly includes a combustor, an engine case, a support structure and a monolithic body. The combustor includes a combustor wall and a combustion chamber within the combustor. The combustor wall forms a peripheral boundary of the combustion chamber. The engine case forms a peripheral boundary of a plenum along the combustor. The support structure extends radially from the combustor wall to the engine case. The monolithic body includes the combustor wall, the engine case, the support structure and a plurality of ports arranged circumferentially about an axis. Each of the ports is fluidly coupled with the plenum and projects axially through the support structure. The ports include a first port. The first port includes a cross-sectional geometry that laterally tapers as the first port extends radially outward within the monolithic body.

According to another aspect of the present disclosure, another assembly is provided for a turbine engine. This engine assembly includes a combustor, an engine case, a support structure and a monolithic body. The combustor includes a combustor wall and a combustion chamber within the combustor. The combustor wall includes an interior surface that forms a peripheral boundary of the combustion chamber. The engine case forms a peripheral boundary of a plenum along the combustor. The support structure extends radially from the combustor wall to the engine case. The monolithic body includes the combustor wall, the engine case, the support structure and a plurality of ports arranged circumferentially about an axis. Each of the ports is fluidly coupled with the plenum and projects axially through the support structure. The ports include a first port. An outlet from the first port includes a notch in the interior surface.

According to still another aspect of the present disclosure, another assembly is provided for a turbine engine. This engine assembly includes a combustor, an engine case, a support structure and a monolithic body. The combustor includes a combustor wall and a combustion chamber within the combustor. The combustor wall includes an interior surface that forms a peripheral boundary of the combustion chamber. The engine case forms a peripheral boundary of a plenum along the combustor. The support structure extends radially from the combustor wall to the engine case. The monolithic body includes the combustor wall, the engine case, the support structure, a plurality of ports and a plurality of struts. The ports are arranged circumferentially about an axis. Each of the ports are fluidly coupled with the plenum and project axially through the support structure. The ports include a first port. The struts are arranged circumferentially about the axis and circumferentially interspersed with the ports. The struts include a first strut forming a lateral side of the first port. The first strut laterally tapers as the first strut extends axially towards an inlet into the first port from the plenum.

A radial outer portion of the cross-sectional geometry may laterally taper as the first port extends radially outward within the monolithic body. The radial inner portion of the cross-sectional geometry may laterally taper as the first port extends radially inwards within the monolithic body.

The first port may include the cross-sectional geometry at an outlet from the first port.

The combustor wall and the support structure may extend axially to an end surface. The outlet may be disposed in the end surface. The cross-sectional geometry may have a hexagonal shape.

The first port may laterally taper as the first port projects axially into the support structure from the outlet.

An interior surface of combustor wall may form the peripheral boundary of the combustion chamber. An outlet from the first port may include a notch in the interior surface.

The notch may laterally taper as the notch projects axially into the interior surface.

The notch may have a triangular shape in the interior surface.

The monolithic body may also include a plurality of struts arranged circumferentially about the axis. Each of the struts may be between a respective circumferentially neighboring pair of the ports. Each of the struts may extend radially from the combustor wall to the engine case.

The struts may include a first strut forming a lateral side of the first port. The first strut may laterally taper as the first strut extends axially towards an inlet into the first port from the plenum.

A first portion of the first strut may laterally taper as the first strut extends axially towards an inlet into the first port from the plenum. A second portion of the first strut may laterally taper as the first strut extends axially towards an outlet from the first port. The second portion of the first strut may be axially between the first portion of the first strut and the outlet from the first port.

A longitudinal centerline of the first port may be parallel with the axis.

A longitudinal centerline of the first port may be angularly offset from the axis.

The combustor may be radially outboard of and circumscribe the engine case and the support structure.

The engine assembly may also include a vane array structure and a cavity. The vane array structure may include a first platform, a second platform and a plurality of vanes extending radially between and connected to the first platform and the second platform. The cavity may be formed by and located radially between the combustor wall and the first platform. Each of the ports may also be fluidly coupled with the combustion chamber through the cavity.

The vane array structure may be radially outboard of and may axially overlap the support structure and the ports.

The monolithic body may also include the first platform.

The engine assembly may also include a compressor section, a turbine section and a flowpath extending through the compressor section, the plenum, the combustion chamber and the turbine section from an inlet into the flowpath to an exhaust from the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
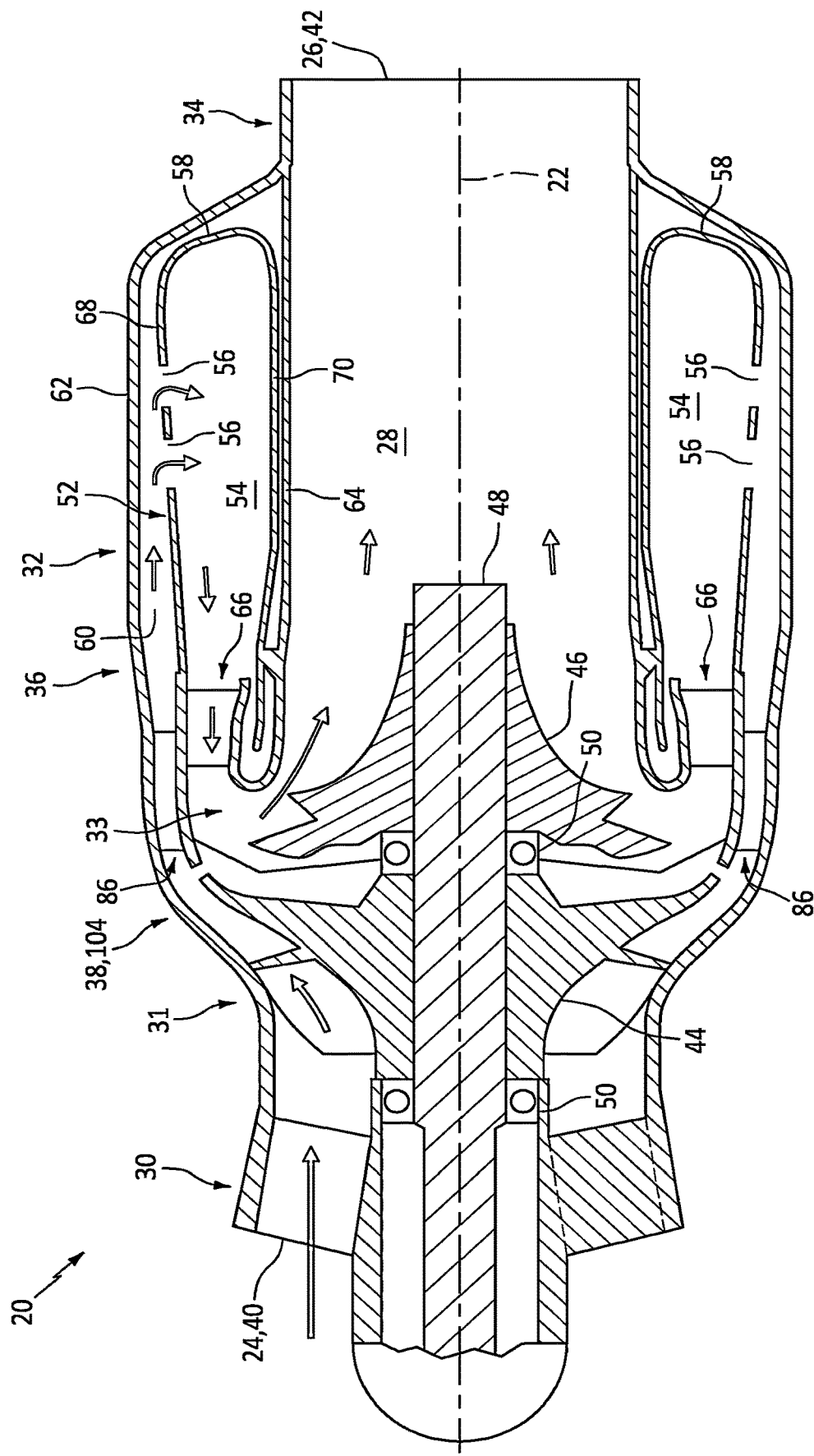
FIG. 1 is a schematic side sectional illustration of a gas turbine engine.

FIG. 1 is a side sectional illustration of a turbine engine 20. The turbine engine 20 of FIG. 1 is configured as a single spool, radial-flow turbojet gas turbine engine. This turbine engine 20 is configured for propelling an aircraft such as, but not limited to, an airplane, a drone (e.g., an unmanned aerial vehicle (UAV)), a spacecraft or any other manned or unmanned aerial vehicle or system. The present disclosure, however, is not limited to such an exemplary turbojet turbine engine configuration nor to an aircraft propulsion system application. For example, the turbine engine 20 may alternatively be configured as an auxiliary power unit (APU) for the aircraft, or an industrial gas turbine engine.

The turbine engine 20 of FIG. 1 extends axially along an axial centerline 22 from a forward, upstream airflow inlet 24 into the turbine engine 20 to an aft, downstream combustion products exhaust 26 from the turbine engine 20. This axial centerline 22 may also be a centerline axis and/or a rotational axis for various components within the turbine engine 20.

The turbine engine 20 includes a core flowpath 28, an inlet section 30, a compressor section 31, a (e.g., reverse flow) combustor section 32, a turbine section 33 and an exhaust section 34. At least (or only) the compressor section 31, the combustor section 32 and the turbine section 33 may form a core 36 of the turbine engine 20. The turbine engine 20 also includes a stationary structure 38 housing and/or forming one or more or all of the engine sections 30-34.

The core flowpath 28 extends within the turbine engine 20 and its engine core 36 from an airflow inlet 40 to the core flowpath 28 to a combustion products exhaust 42 from the core flowpath 28. More particularly, the core flowpath 28 of FIG. 1 extends sequentially through the inlet section 30, the compressor section 31, the combustor section 32 and the turbine section 33 to the exhaust section 34. The core inlet 40 of FIG. 1 forms the engine inlet 24 into the turbine engine 20. The core exhaust 42 of FIG. 1 forms the engine exhaust 26 from the turbine engine 20.

The compressor section 31 includes a bladed compressor rotor 44. The turbine section 33 includes a bladed turbine rotor 46. Each of these engine rotors 44, 46 includes a rotor base (e.g., a hub or a disk) and a plurality of rotor blades arranged circumferentially around and connected to the rotor base. The rotor blades, for example, may be formed integral with or mechanically fastened, welded, brazed and/or otherwise attached to the respective rotor base.

The compressor rotor 44 may be configured as a radial flow compressor rotor (e.g., an axial inflow-radial outflow compressor rotor), and the compressor section 31 may be configured as a radial flow compressor section. The turbine rotor 46 may be configured as a radial flow turbine rotor (e.g., a radial inflow-axial outflow turbine rotor), and the turbine section 33 may be configured as a radial flow turbine section. The compressor rotor 44 is connected to the turbine rotor 46 through an engine shaft 48. This engine shaft 48 is rotatably supported by the stationary structure 38 through a plurality of bearings 50; e.g., rolling element bearings, journal bearings, etc.

The combustor section 32 includes an annular combustor 52 with an annular combustion chamber 54. The combustor 52 of FIG. 1 is configured as a reverse flow combustor. Inlet ports 56/flow tubes into the combustion chamber 54, for example, may be arranged at (e.g., on, adjacent or proximate) and/or towards an aft bulkhead wall 58 of the combustor 52. An outlet from the combustor 52 may be arranged axially aft of an inlet to the turbine section 33. The combustor 52 may also be arranged radially outboard of and/or axially overlap at least a (e.g., aft) portion of the turbine section 33. With this arrangement, the core flowpath 28 of FIG. 1 reverses direction (e.g., from a forward-to-aft direction to an aft-to-forward direction) a first time as the core flowpath 28 extends from a diffuser plenum 60 surrounding the combustor 52 into the combustion chamber 54. The core flowpath 28 of FIG. 1 then reverses direction (e.g., from the aft-to-forward direction to the forward-to-aft direction) a second time as the core flowpath 28 extends from the combustion chamber 54 into the turbine section 33.

During operation, air enters the turbine engine 20 through the inlet section 30 and its core inlet 40. The inlet section 30 directs the air from the core inlet 40 into the core flowpath 28 and the compressor section 31. The air entering the core flowpath 28 may be referred to as "core air". This core air is compressed by the compressor rotor 44. The compressed core air is directed through a diffuser and its diffuser plenum 60 into the combustion chamber 54. Fuel is injected and mixed with the compressed core air to provide a fuel-air mixture. This fuel-air mixture is ignited within the combustion chamber 54, and combustion products thereof flow through the turbine section 33 and cause the turbine rotor 46 to rotate. The rotation of the turbine rotor 46 drives rotation of the compressor rotor 44 and, thus, compression of the air received from the core inlet 40. The exhaust section 34 directs the combustion products out of the turbine engine 20 to provide forward engine thrust.

Figure 2:
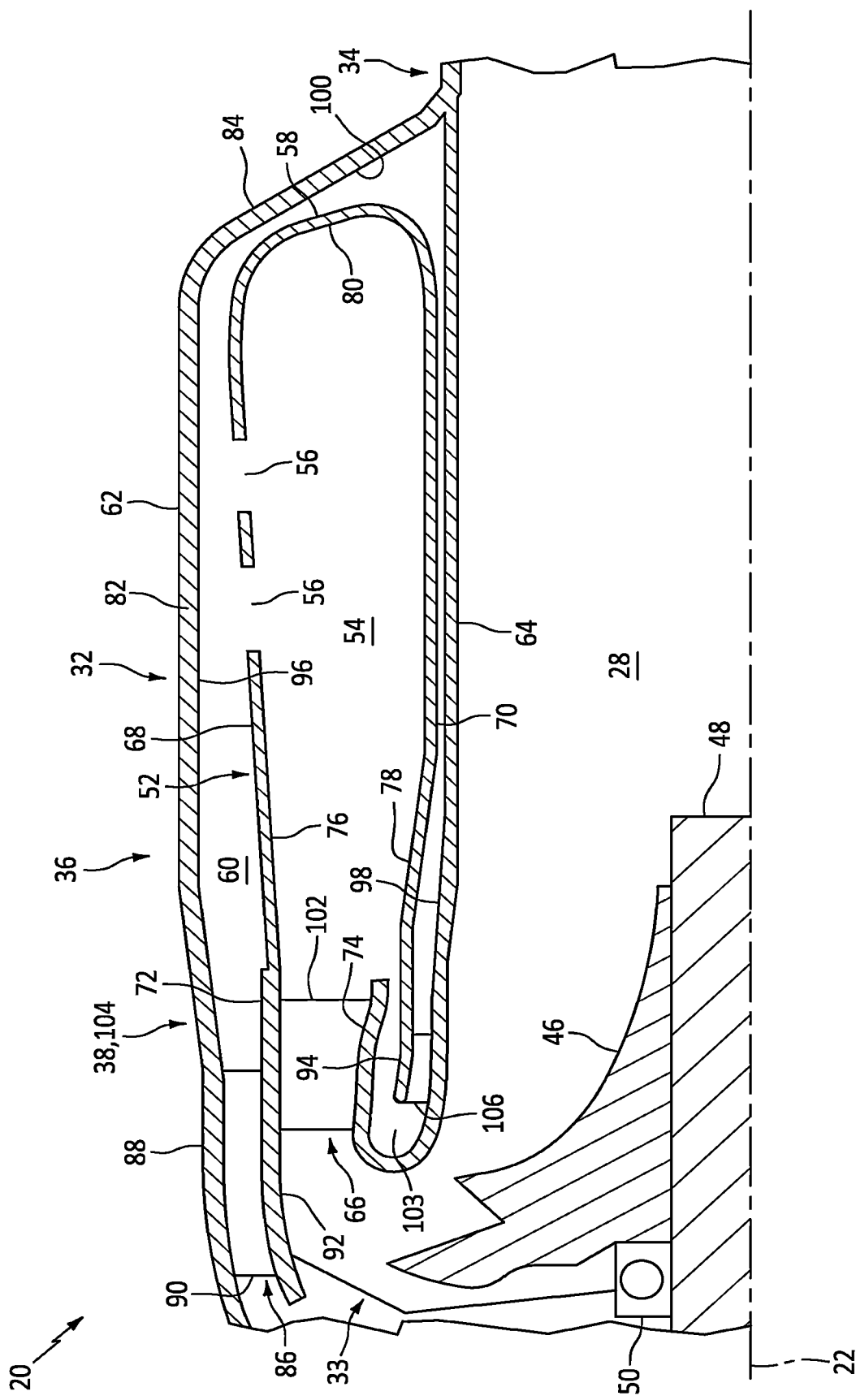
FIG. 2 is a schematic side sectional illustration of a portion of the gas turbine engine at its combustor.

Referring to FIG. 2, the stationary structure 38 includes the combustor 52 and one or more engine cases 62 and 64 forming the diffuser plenum 60 along the combustor 52. The stationary structure 38 of FIG. 2 also includes a vane array structure 66, which may be configured as an outlet nozzle from the combustor section 32 and its combustor 52 and/or an inlet nozzle into the turbine section 33.

The combustor 52 of FIG. 2 includes an outer combustor wall 68, an inner combustor wall 70 and the bulkhead wall 58. The combustor 52 and each of its combustor walls 58, 68, 70 extends circumferentially about (e.g., completely around) the axial centerline 22. The combustor 52 and each of its combustor walls 68, 70 may thereby have a full-hoop (e.g., tubular) geometry, and the bulkhead wall 58 may have a full-hoop (e.g., annular, frustoconical, etc.) geometry.

The outer combustor wall 68 is arranged axially between the bulkhead wall 58 and the vane array structure 66. The outer combustor wall 68 of FIG. 2, for example, projects axially along the axial centerline 22 (e.g., in the forward direction) out from the bulkhead wall 58 to an outer platform 72 of the vane array structure 66. The outer combustor wall 68 of FIG. 2 is connected to (e.g., formed integral with) the bulkhead wall 58 at a radial out end of the bulkhead wall 58, and the outer platform 72 at an aft end of the outer platform 72.

The inner combustor wall 70 is arranged axially between the bulkhead wall 58 and the vane array structure 66. The inner combustor wall 70 of FIG. 2, for example, projects axially along the axial centerline 22 (e.g., in the forward direction) out from the bulkhead wall 58 towards an inner platform 74 of the vane array structure 66. The inner combustor wall 70 of FIG. 2 is connected to (e.g., formed integral with) the bulkhead wall 58 at a radial inner end of the bulkhead wall 58.

The bulkhead wall 58 is arranged radially between the outer combustor wall 68 and the inner combustor wall 70. The bulkhead wall 58 of FIG. 2, for example, projects radially (e.g., outward away from the axial centerline 22) out from the inner combustor wall 70 to the outer combustor wall 68. The bulkhead wall 58 of FIG. 2 is connected to the outer combustor wall 68 at an aft end of the outer combustor wall 68, and to the inner combustor wall 70 at an aft end of the inner combustor wall 70.

The combustor walls 58, 68 and 70 collectively form the combustion chamber 54 of FIG. 2 within the combustor 52. An interior surface 76 (e.g., a tubular radial inner surface) of the outer combustor wall 68 forms an outer peripheral boundary of the combustion chamber 54. An interior surface 78 (e.g., a tubular radial outer surface) of the inner combustor wall 70 forms an inner peripheral boundary of the combustion chamber 54. An interior surface 80 (e.g., an annular forward surface) of the bulkhead wall 58 forms a side peripheral boundary of the combustion chamber 54. The combustion chamber 54 thereby extends radially within the combustor 52 between the inner combustor wall 70 and its interior surface 78 and the outer combustor wall 68 and its interior surface 76. The combustion chamber 54 projects axially into the combustor 52 from the outlet of the combustion chamber 54 (e.g., at the vane array structure 66) to the bulkhead wall 58 and its interior surface 80.

The diffuser case 62 is spaced radially outboard from the combustor 52 and the vane array structure 66. The diffuser case 62 extends axially along the axial centerline 22, and axially overlaps the combustor 52 and its outer combustor wall 68. The diffuser case 62 may also axially overlap the vane array structure 66 and its outer platform 72. The diffuser case 62 of FIG. 2, for example, includes a diffuser sidewall 82 and a diffuser endwall 84. The diffuser sidewall 82 projects axially (e.g., in the forward direction) out from the diffuser endwall 84, axially along the outer combustor wall 68 and the outer platform 72, to a diffuser nozzle 86; e.g., another vane array structure. This diffuser sidewall 82 of FIG. 2 is connected to (e.g., formed integral with) the diffuser endwall 84 at a radial outer end of the diffuser endwall 84, and to an outer platform 88 of the diffuser nozzle 86 at an aft end of the outer platform 88. The diffuser endwall 84 projects radially (e.g., outward away from the axial centerline 22) out from the turbine case 64, along the bulkhead wall 58, to the diffuser sidewall 82. This diffuser endwall 84 of FIG. 2 is connected to (e.g., formed integral with) the diffuser sidewall 82 at an aft end of the diffuser sidewall 82, and to the turbine case 64. The diffuser case 62 and its diffuser walls 82 and 84 extend circumferentially about (e.g., completely around) the axial centerline 22. The diffuser case 62 and its diffuser walls 82 and 84 may thereby circumscribe the combustor 52 and/or the turbine case 64.

The diffuser nozzle 86 is configured to condition the core air leaving the compressor section 31 and entering the diffuser plenum 60. The diffuser nozzle 86 of FIG. 2, for example, includes one or more diffuser guide vanes 90 configured to impart swirl to the core air. These diffuser guide vanes 90 are arranged circumferentially about the axial centerline 22 in an array; e.g., a circular array. Each of the diffuser guide vanes 90 extends radially across the core flowpath 28. Each of the diffuser guide vanes 90 of FIG. 2, for example, extends radially between and is connected to (e.g., formed integral with) the outer platform 88 and an inner platform 92 of the diffuser nozzle 86. Here, the inner platform 92 may be partially (or completely) formed by the outer platform 72 of the vane array structure 66. However, in other embodiments, the inner platform 92 and the outer platform 72 may be discrete; e.g., axially offset.

The turbine case 64 is spaced radially outboard of the turbine rotor 46. The turbine case 64 extends axially along the axial centerline 22, and axially overlaps at least an aft portion of the turbine rotor 46. The turbine case 64 extends circumferentially about (e.g., completely around) the axial centerline 22, and circumscribes at least the aft portion of the turbine rotor 46. The turbine case 64 thereby houses at least the aft portion of the turbine rotor 46. The turbine case 64 also forms a peripheral boundary of the core flowpath 28 across at least the aft portion of the turbine rotor 46. The turbine case 64 of FIG. 2 is also spaced radially inboard from the combustor 52 and the vane array structure 66. For example, a downstream end portion 94 (e.g., a forward end portion) of the inner combustor wall 70 projects axially into a (e.g., annular) space radially between the turbine case 64 and the inner platform 74. The turbine case 64 may be connected to (e.g., formed integral with) the inner platform 74. With this arrangement, a flowpath wall collectively formed by the turbine case 64 and the inner platform 74 may thereby wrap around the downstream end portion 94 of the inner combustor wall 70.

The engine cases 62 and 64 collectively form the diffuser plenum 60 of FIG. 2 around the combustor 52. A (e.g., tubular) radial inner surface 96 of the diffuser sidewall 82 forms an outer peripheral boundary of the diffuser plenum 60 radially outboard of the combustor 52 and its outer combustor wall 68. A (e.g., tubular) radial outer surface 98 of the diffuser sidewall 82 forms an inner peripheral boundary of the diffuser plenum 60 radially inboard of the combustor 52 and its inner combustor wall 70. An (e.g., annular) axial side surface 100 of the diffuser endwall 84 forms a side peripheral boundary of the diffuser plenum 60 axially to a side of the combustor 52 and its bulkhead wall 58. With this arrangement, a radial outer portion of the diffuser plenum 60 extends radially between and is formed by the diffuser case 62 and the outer combustor wall 68. A radial inner portion of the diffuser plenum 60 extends radially between and is formed by the turbine case 64 and the inner combustor wall 70. An axial end portion of the diffuser plenum 60 extends axially between and is formed by the diffuser endwall 84 and the bulkhead wall 58. The diffuser plenum 60 may thereby extend axially along each combustor wall 68, 70 and radially along the bulkhead wall 58.

The vane array structure 66 is configured to condition the combustion products exiting the combustor 52 and its combustion chamber 54. The vane array structure 66 of FIG. 2, for example, includes one or more guide vanes 102 configured to impart swirl to the combustion products. These guide vanes 102 are arranged circumferentially about the axial centerline 22 in an array; e.g., a circular array. Each of the guide vanes 102 extends radially across the core flowpath 28. Each of the guide vanes 102 of FIG. 2, for example, extends radially between and is connected to (e.g., formed integral with) the outer platform 72 and the inner platform 74.

The inner platform 74 is spaced radially outboard of the inner combustor wall 70 as well as the turbine case 64. The inner platform 74 extends circumferentially about (e.g., completely around) the axial centerline 22, and circumscribes the inner combustor wall 70 as well as the turbine case 64. With this arrangement, a (e.g., annular) cavity 103 formed by and radially between the inner platform 74 and the inner combustor wall 70 may fluidly couple the inner portion of the diffuser plenum 60 to the combustion chamber 54.

At least a portion (or an entirety) of the stationary structure 38 may be formed as a monolithic body 104. At least the stationary structure members 52, 62, 64, 66 and 86 of FIG. 2, for example, are included in the monolithic body 104. Herein, the term "monolithic" may describe an apparatus which is formed as a single, unitary body. The stationary structure members 52, 62, 64, 66 and 86, for example, may be additively manufactured, cast, machined and/or otherwise formed together as an integral, unitary body. By contrast, a non-monolithic body may include multiple parts which are discretely formed from one another, where those parts are subsequently mechanically fastened and/or otherwise attached to one another.

Figure 3:
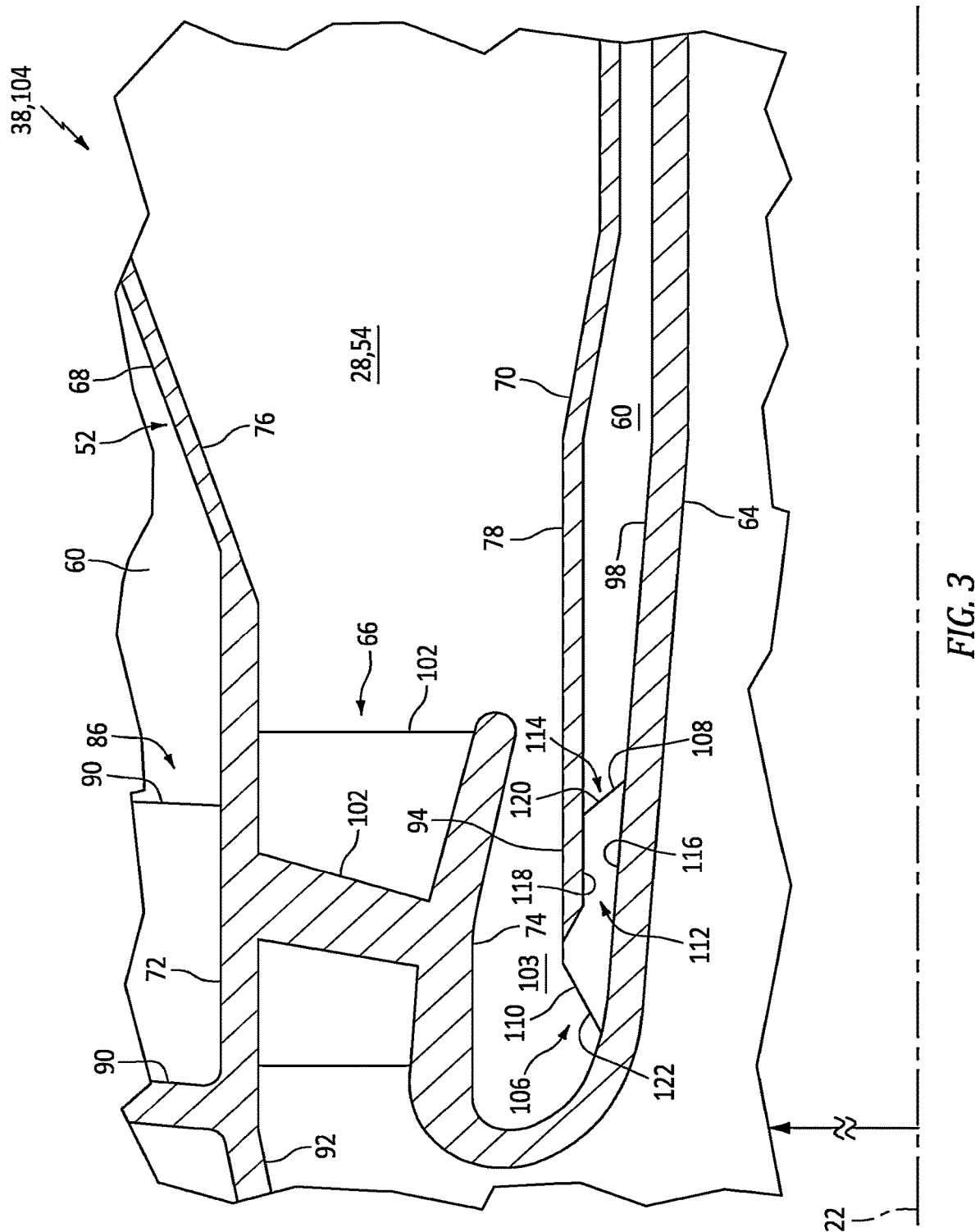
FIG. 3 is a perspective cutaway illustration of a portion of the gas turbine engine at a support structure between the combustor and a turbine case.

Referring to FIG. 3, the monolithic body 104 also includes a support structure 106 for the combustor 52. The support structure 106 of FIG. 3 is configured to support the inner combustor wall 70 and its downstream end portion 94. The support structure 106 is also configured to locate the downstream end portion 94 of the inner combustor wall 70 relative to the turbine case 64 and the inner platform 74; e.g., maintain radial spacing between the stationary structure members 64, 70, 74. Moreover, the stationary structure 38 of FIG. 3 is configured to facilitate building the stationary structure 38 as the monolithic body 104 using additive manufacturing.

The support structure 106 of FIG. 3 is arranged radially between and connected to (e.g., formed integral with) the inner combustor wall 70 and the turbine case 64. This support structure 106, for example, projects radially out from the turbine case 64 to the downstream end portion 94 of the inner combustor wall 70. The support structure 106 extends axially along the support structure members 64 and 70 from an upstream, aft end surface 108 of the support structure 106 to a downstream, forward end surface 110 of the support structure 106 and the inner combustor wall 70. Briefly, the aft end surface 108 extends radially between and is contiguous with the inner combustor wall 70 and the turbine case 64. The forward end surface 110 extends radially between and is contiguous with the turbine case 64 and the interior surface 78 of the inner combustor wall 70. The support structure 106 extends circumferentially about (e.g., completely around) the axial centerline 22 and along the stationary structure members 64 and 70.

Figure 4:
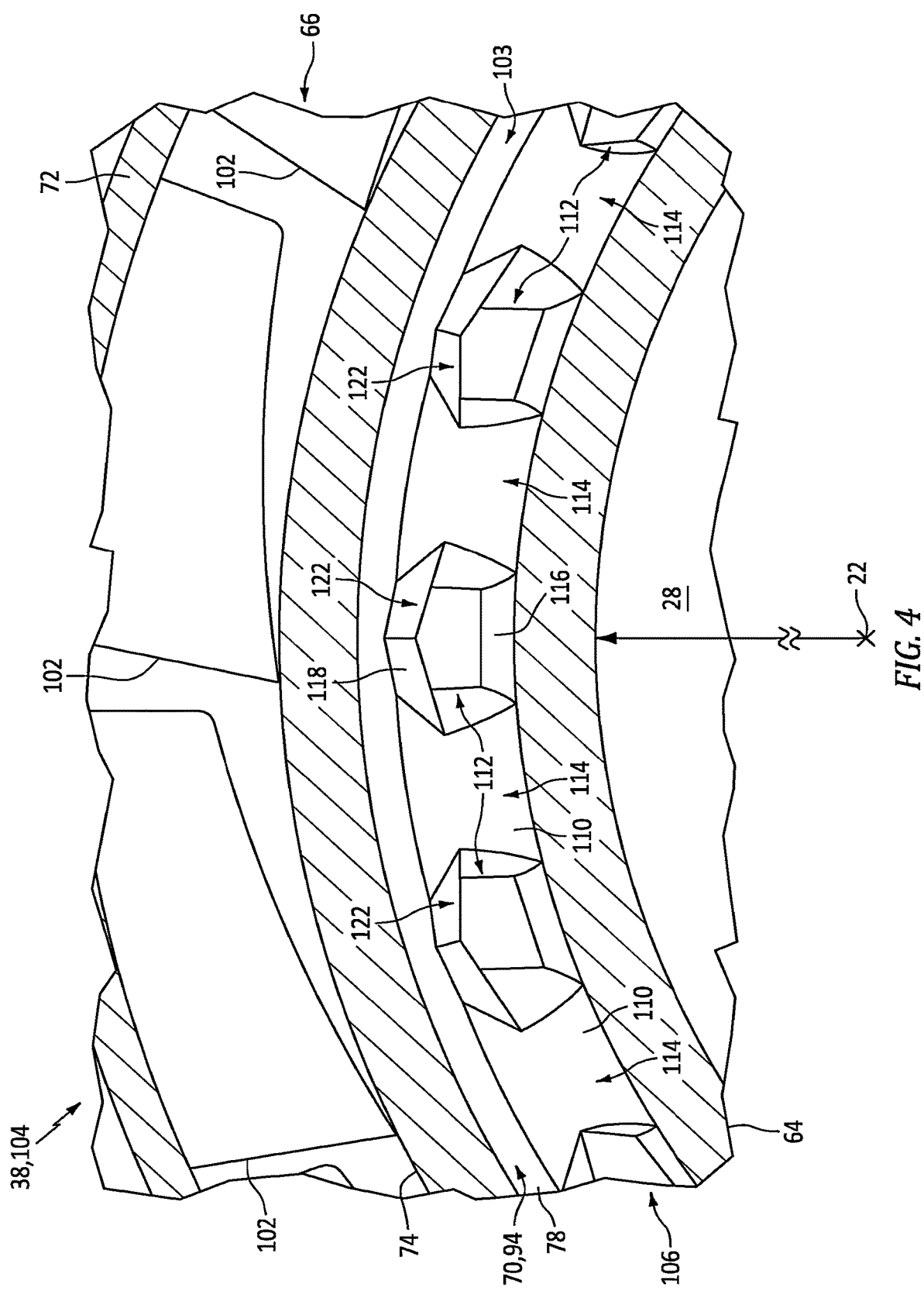
FIG. 4 is another perspective cutaway illustration of another portion of the gas turbine engine at the support structure.

Referring to FIG. 4, the support structure 106 includes a plurality of ports 112 and a plurality of struts 114 circumferentially interposed with the ports 112. The ports 112 of FIG. 4, for example, are arranged circumferentially about the axial centerline 22 in an array; e.g., a circular array. Similarly, the struts 114 are arranged circumferentially about the axial centerline 22 in an array; e.g., a circular array. Each of the ports 112 may be arranged circumferentially between a respective circumferentially neighboring (e.g., adjacent) pair of the struts 114. Similarly, each of the struts 114 may be arranged circumferentially between a respective circumferentially neighboring pair of the ports 112.

Each port 112 of FIG. 4 extends laterally (e.g., circumferentially or tangentially) within the monolithic body 104 and its support structure 106 between the respective circumferentially neighboring pair of the struts 114. Each port 112 extends radially within the monolithic body 104 (e.g., through the support structure 106) from a radial inner side 116 of the respective port 112 to a radial outer side 118 of the respective port 112. The port inner side 116 of FIG. 4 is formed by the turbine case 64. The port outer side 118 of FIG. 4 is formed by the inner combustor wall 70. Referring to FIG. 3, each port 112 projects axially along the axial centerline 22 through the monolithic body 104 and its support structure 106 from the aft end surface 108 to the forward end surface 110. More particularly, each port 112 extends longitudinally (e.g., axially) along a centerline 119 (see FIG. 6) of the respective port 112 from an inlet 120 into the respective port 112 to an outlet 122 from the respective port 112. The port inlet 120 of FIG. 3 is (e.g., wholly) formed in the aft end surface 108, and the port inlet 120 is fluidly coupled with the inner portion of the diffuser plenum 60. The port outlet 122 of FIG. 3 is (e.g., partially, or wholly) formed in the forward end surface 110, and the port outlet 122 is fluidly coupled with the combustion chamber 54 through the cavity 103.

Figure 5:
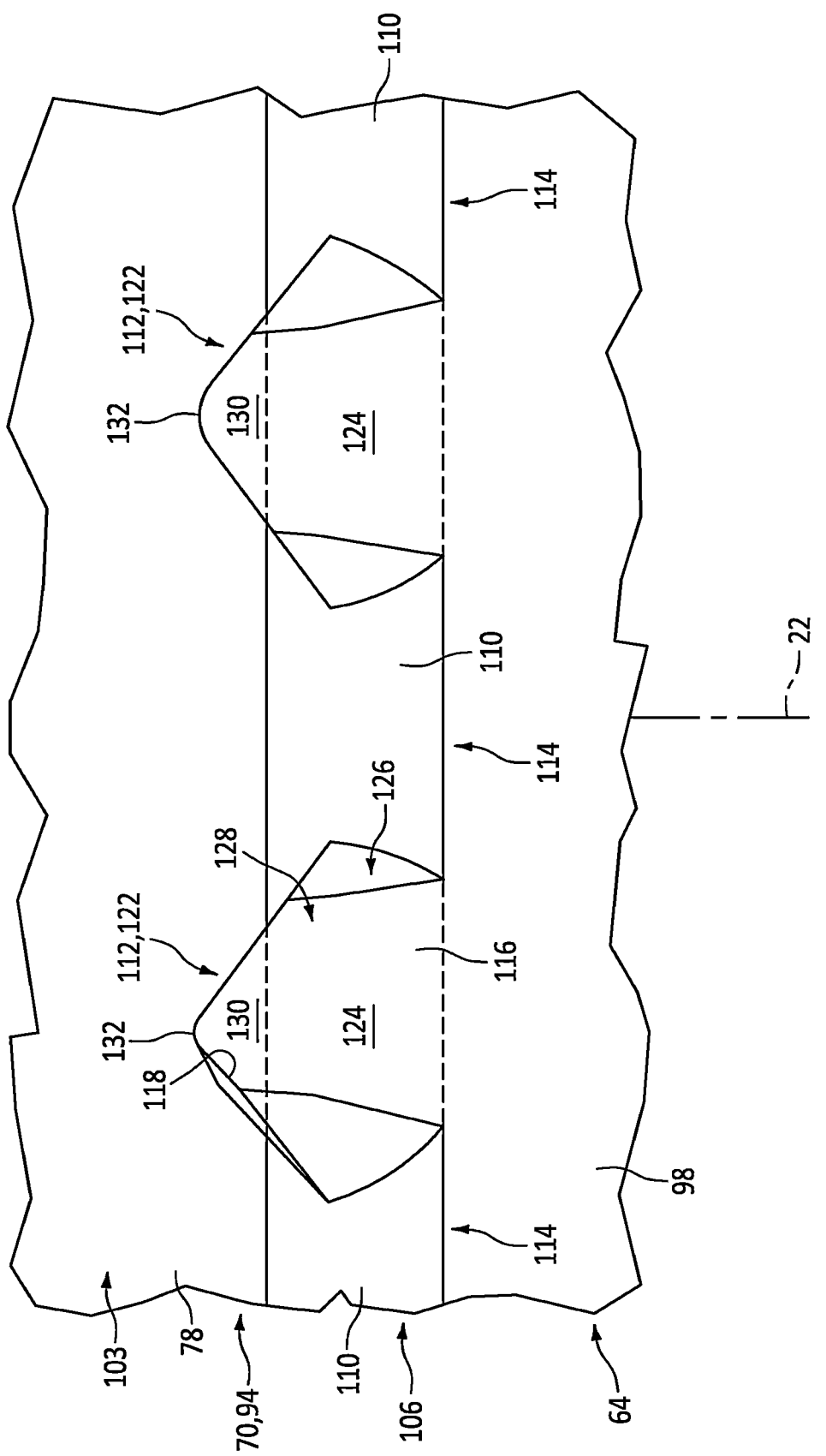
FIG. 5 is a perspective illustration of another portion of the gas turbine engine at the support structure.

Referring to FIG. 5, the port outlet 122 may include (e.g., be formed by) an aperture 124 in the forward end surface 110. Each port 112 of FIG. 5 and its aperture 124 has a cross-sectional geometry when viewed, for example, in a first reference plane perpendicular to the axial centerline 22 and/or the port centerline 119 (see FIG. 6). This cross-sectional geometry may have a radial inner portion 126 and a radial outer portion 128. The inner portion 126 of FIG. 5 laterally tapers as that inner portion 126 extends radially inward (e.g., towards the axial centerline 22) from the outer portion 128 towards (e.g., to) the port inner side 116/the turbine case 64. The outer portion 128 of FIG. 5 laterally tapers as that outer portion 128 extends radially outward (e.g., away from the axial centerline 22) from the inner portion 126 towards (e.g., to) the port outer side 118/the inner combustor wall 70. The cross-sectional geometry, for example, may have a double-tapered polygonal shape; e.g., a hexagonal shape. The present disclosure, however, is not limited to such an exemplary cross-sectional geometry.

The port outlet 122 may also include (e.g., be formed by) a notch 130 in the interior surface 78 of the inner combustor wall 70. The notch 130 of FIG. 5 projects axially along the axial centerline 22 into the interior surface 78 of the inner combustor wall 70 from the forward end surface 110 to a distal end 132 (e.g., a point) of the notch 130. The notch 130 may have a tapered geometry. The notch 130 of FIG. 5, for example, laterally tapers as the notch 130 extends axially into the interior surface 78 of the inner combustor wall 70 from the forward end surface 110 towards (e.g., to) the notch end 132. The notch 130 of FIG. 5 has a single tapered polygonal shape; e.g., a triangular shape. The present disclosure, however, is not limited to such an exemplary geometry.

Each strut 114 extends laterally between (and forms lateral sides of) the respective circumferentially neighboring pair of the ports 112. Each strut 114 extends radially between and to the turbine case 64 and the inner combustor wall 70. Referring to FIG. 3, each strut 114 extends axially along the axial centerline 22 between and to the aft end surface 108 and the forward end surface 110. The struts 114 of FIG. 3 collectively form the aft end surface 108. The struts 114 of FIG. 3 along with the inner combustor wall 70 collectively form the forward end surface 110.

Figure 6:
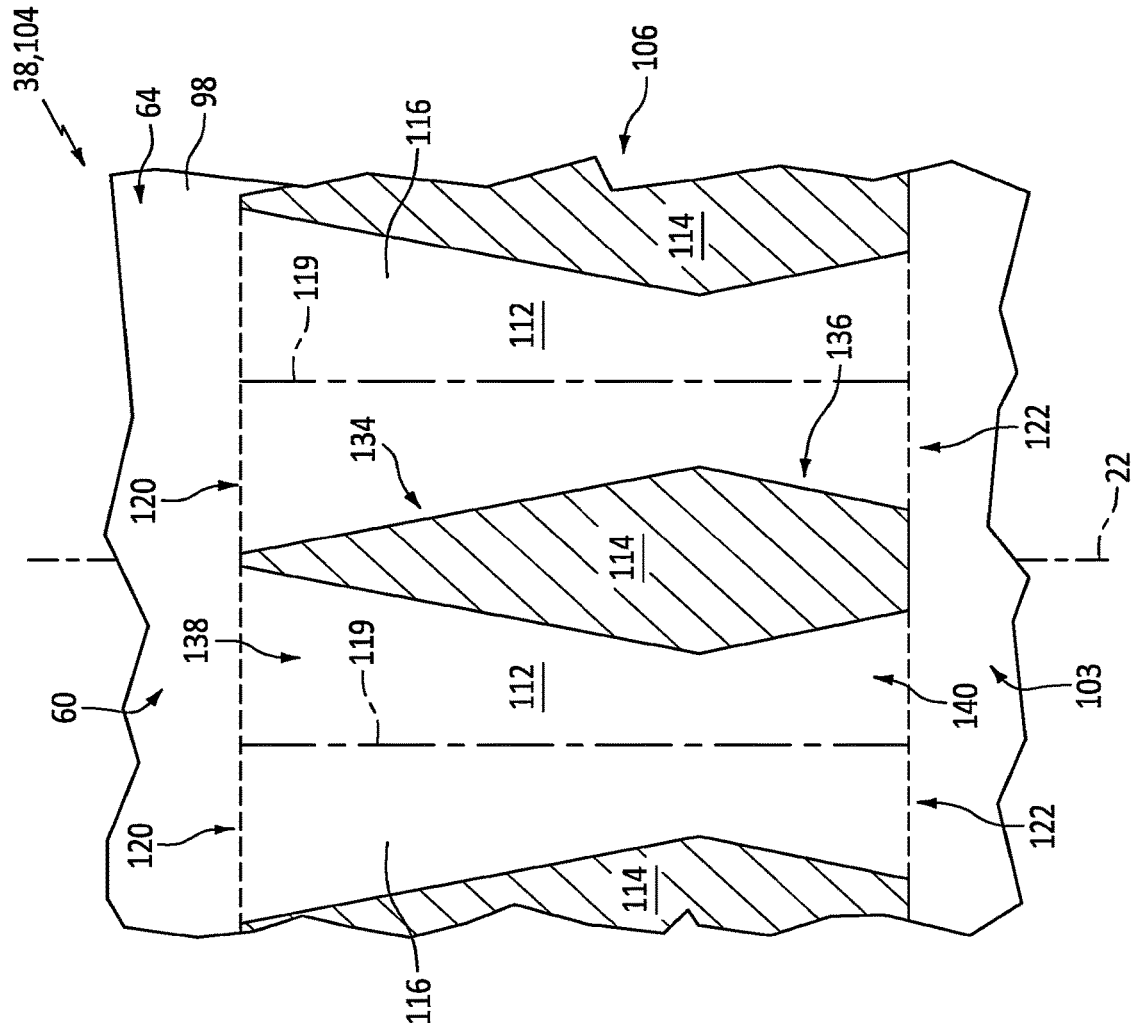
FIG. 6 is a schematic sectional illustration through a portion of the support structure.

Referring to FIG. 6, each strut 114 may be configured as an airfoil; e.g., a guide vane. Each strut 114 of FIG. 6, for example, includes an upstream, aft portion 134 and a downstream, forward portion 136. The aft portion 134 may laterally taper as that aft portion 134 projects axially out from the forward portion 136 towards (e.g., to) the aft end surface 108/the respective laterally flanking port inlets 120. The forward portion 136 may laterally taper as that forward portion 136 projects axially out form the aft portion 134 toward (e.g., to) the forward end surface 110/the respective laterally flanking port outlets 122. Each strut 114 of FIG. 6, for example, has a double tapered sectional geometry. With such an arrangement, an upstream, aft portion 138 of each port 112 may laterally taper as that aft portion 138 projects axially into the support structure 106 from the respective port inlet 120. Similarly, a downstream, forward portion 140 of each port 112 may laterally taper as that forward portion 140 projects axially into the support structure 106 from the respective port outlet 122.

Figure 7:
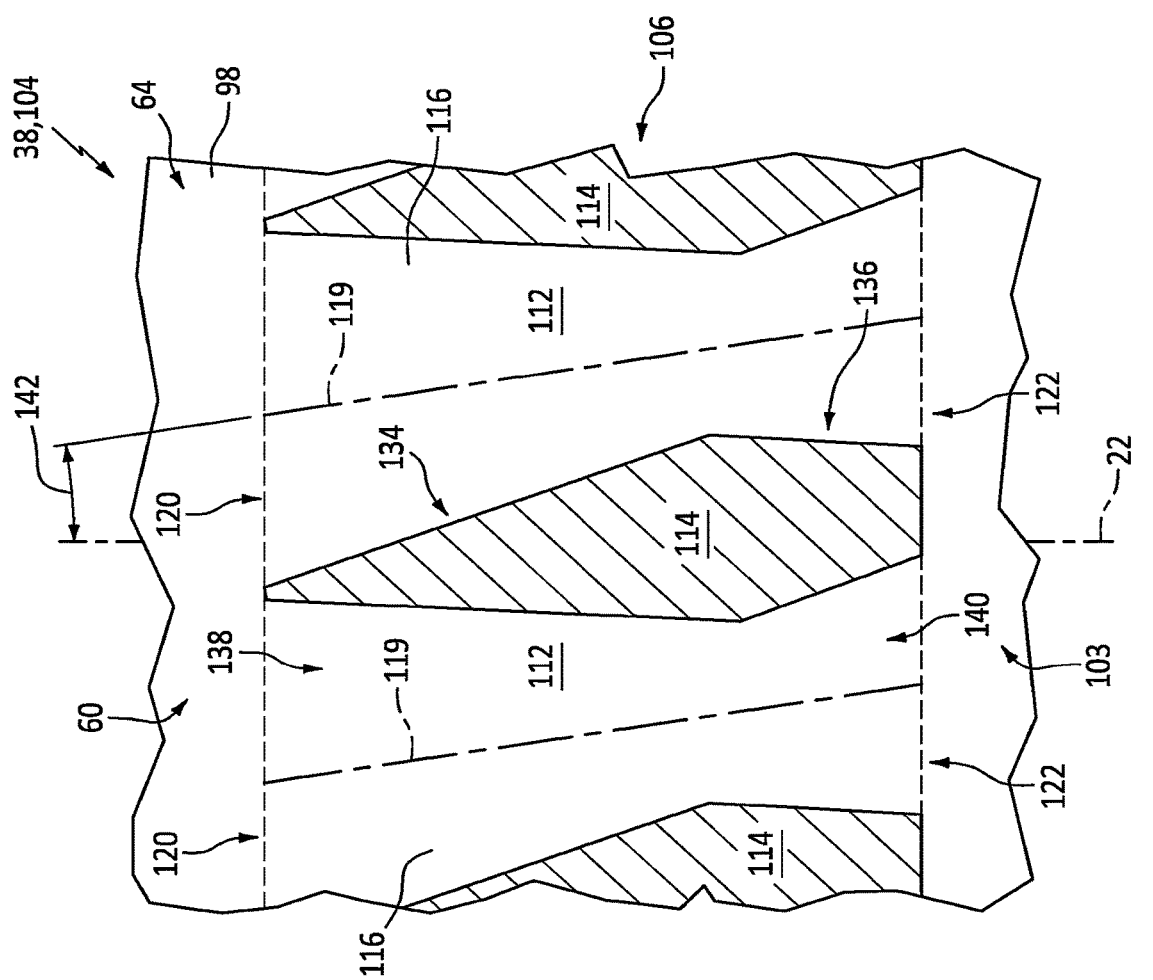
FIG. 7 is a schematic sectional illustration through a portion of the support structure with canted port centerlines.

In some embodiments, referring to FIG. 6, the port centerline 119 may be parallel with the axial centerline 22 when viewed, for example, in a second reference plane tangent to a reference circle around the axial centerline 22. In other embodiments, referring to FIG. 7, the port centerline 119 may be angularly offset from the axial centerline 22 by an included angle 142; e.g., a non-zero acute angle. Moreover, while each port centerline 119 of FIGS. 6 and 7 is straight, it is contemplated some or all of the port centerline 119 may alternatively be non-straight; e.g., curved.

The turbine engine 20 is described above as a single spool, radial-flow turbojet gas turbine engine for ease of description. The present disclosure, however, is not limited to such an exemplary turbine engine. The turbine engine 20, for example, may alternatively be configured as an axial flow gas turbine engine. The turbine engine 20 may be configured as a direct drive gas turbine engine. The turbine engine 20 may alternatively include a geartrain that connects one or more rotors together such that the rotors rotate at different speeds. The turbine engine 20 may be configured with a single spool (e.g., see FIG. 1), two spools, or with more than two spools. The turbine engine 20 may be configured as a turbofan engine, a turbojet engine, a propfan engine, a pusher fan engine or any other type of turbine engine. In addition, while the turbine engine 20 is described above with an exemplary reverse flow annular combustor, the turbine engine 20 may also or alternatively include any other type/configuration of annular, tubular (e.g., CAN), axial flow and/or reverse flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a combustor including a combustor wall and a combustion chamber within the combustor, an interior surface of the combustor wall forming a peripheral boundary of the combustion chamber;
an engine case forming a peripheral boundary of a plenum along the combustor;
a support structure extending radially from the combustor wall to the engine case; and
a monolithic body including the combustor wall, the engine case, the support structure, a first platform and a plurality of ports arranged circumferentially about an axis, each of the plurality of ports fluidly coupled with the plenum and projecting axially through the support structure, the plurality of ports comprising a first port, and the first port comprising a cross-sectional geometry, wherein a radially outer portion of the cross-sectional geometry laterally tapers as the first port extends radially outward within the monolithic body and a radially inner portion of the cross-sectional geometry laterally tapers as the first port extends radially inwards from the radially outer portion of the cross-sectional geometry within the monolithic body;
a cavity formed by and located radially between the combustor wall and the first platform, each of the plurality of ports further fluidly coupled with the combustion chamber through the cavity; and
an outlet from the first port includes a notch in the interior surface, the notch laterally tapers as the notch projects axially into the interior surface.

2. The assembly of claim 1, further comprising a vane array structure including the first platform, a second platform and a plurality of vanes extending radially between and connected to the first platform and the second platform.

3. The assembly of claim 2, wherein the vane array structure is radially outboard of and axially overlaps the support structure and the plurality of ports.

4. The assembly of claim 1, wherein
the combustor wall and the support structure extend axially to an end surface;
the outlet is disposed in the end surface; and
the cross-sectional geometry has a hexagonal shape.

5. The assembly of claim 1, wherein the notch has a triangular shape in the interior surface.

6. The assembly of claim 1, wherein
the monolithic body further includes a plurality of struts arranged circumferentially about the axis;
each of the plurality of struts is between a respective circumferentially neighboring pair of the plurality of ports; and
each of the plurality of struts extends radially from the combustor wall to the engine case.

7. The assembly of claim 6, wherein
the plurality of struts comprise a first strut forming a lateral side of the first port; and the first strut laterally tapers as the first strut extends axially towards an inlet into the first port from the plenum.

8. The assembly of claim 7, wherein
a first portion of the first strut laterally tapers as the first strut extends axially towards an inlet into the first port from the plenum;
a second portion of the first strut laterally tapers as the first strut extends axially towards an outlet from the first port; and
the second portion of the first strut is axially between the first portion of the first strut and the outlet from the first port.

9. The assembly of claim 1, wherein a longitudinal centerline of the first port is parallel with the axis.

10. The assembly of claim 1, wherein a longitudinal centerline of the first port is angularly offset from the axis.

11. The assembly of claim 1, wherein the combustor is radially outboard of and circumscribes the engine case and the support structure.

12. The assembly of claim 1, further comprising:
a compressor section;
a turbine section; and
a flowpath extending through the compressor section, the plenum, the combustion chamber and the turbine section from an inlet into the flowpath to an exhaust from the flowpath.

\* \* \* \* \*